United States Patent
Rice

(10) Patent No.: US 10,189,450 B2
(45) Date of Patent: Jan. 29, 2019

(54) SENSOR CLEANING SYSTEM FOR VEHICLES

(71) Applicant: Uber Technologies, Inc., San Francisco, CA (US)

(72) Inventor: Wesly Mason Rice, Glenshaw, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/213,110

(22) Filed: Jul. 18, 2016

(65) Prior Publication Data

US 2018/0015907 A1    Jan. 18, 2018

(51) Int. Cl.
*B60S 1/56* (2006.01)
*G05D 1/00* (2006.01)
*B60S 1/62* (2006.01)
*B60S 1/54* (2006.01)
*B60S 1/52* (2006.01)

(52) U.S. Cl.
CPC . *B60S 1/56* (2013.01); *B60S 1/52* (2013.01); *B60S 1/54* (2013.01); *B60S 1/62* (2013.01); *G05D 1/0088* (2013.01)

(58) Field of Classification Search
None
See application file for complete search history.

(56) References Cited

U.S. PATENT DOCUMENTS

| | | |
|---|---|---|
| 2002/0005440 A1 | 1/2002 | Holt |
| 2015/0151722 A1* | 6/2015 | Gokan ................ B60S 1/50 134/102.2 |
| 2015/0343999 A1* | 12/2015 | Lopez Galera .......... B08B 3/02 134/30 |
| 2016/0339875 A1 | 11/2016 | Ina |
| 2017/0225660 A1 | 8/2017 | Trebouet |
| 2017/0313286 A1 | 11/2017 | Galera |
| 2017/0355352 A1 | 12/2017 | Bulgajewski |
| 2018/0013933 A1 | 1/2018 | Barton |
| 2018/0015907 A1 | 1/2018 | Rice |

FOREIGN PATENT DOCUMENTS

| | | |
|---|---|---|
| EP | 2845773 | 3/2015 |
| EP | 2873571 | 5/2015 |
| WO | WO 2002/072274 | 9/2002 |

OTHER PUBLICATIONS

ISR and Written Opinion issued in PCT/US2017/042005 dated Oct. 12, 2017.

\* cited by examiner

*Primary Examiner* — Michael E Barr
*Assistant Examiner* — Jason Riggleman
(74) *Attorney, Agent, or Firm* — Mahamedi IP Law LLP

(57) ABSTRACT

A device for cleaning a sensor can include a first valve, a second valve, a set of fluid nozzles, and a housing structure. The housing structure includes a first channel to enable fluid to move from the first valve to the set of fluid nozzles, a cavity, a second channel to enable air to move from the second valve to the cavity, and a slit opening to enable air to move from the cavity to outside the housing structure.

20 Claims, 15 Drawing Sheets

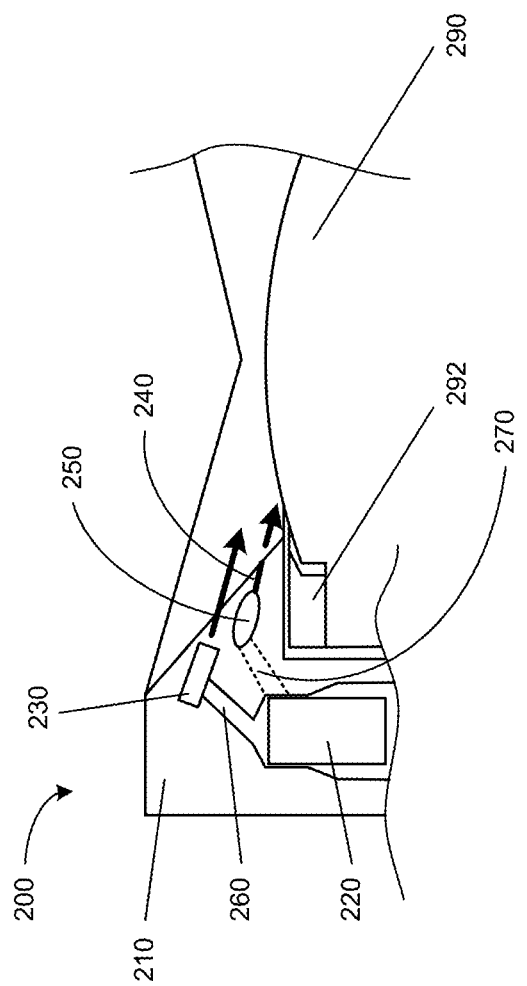

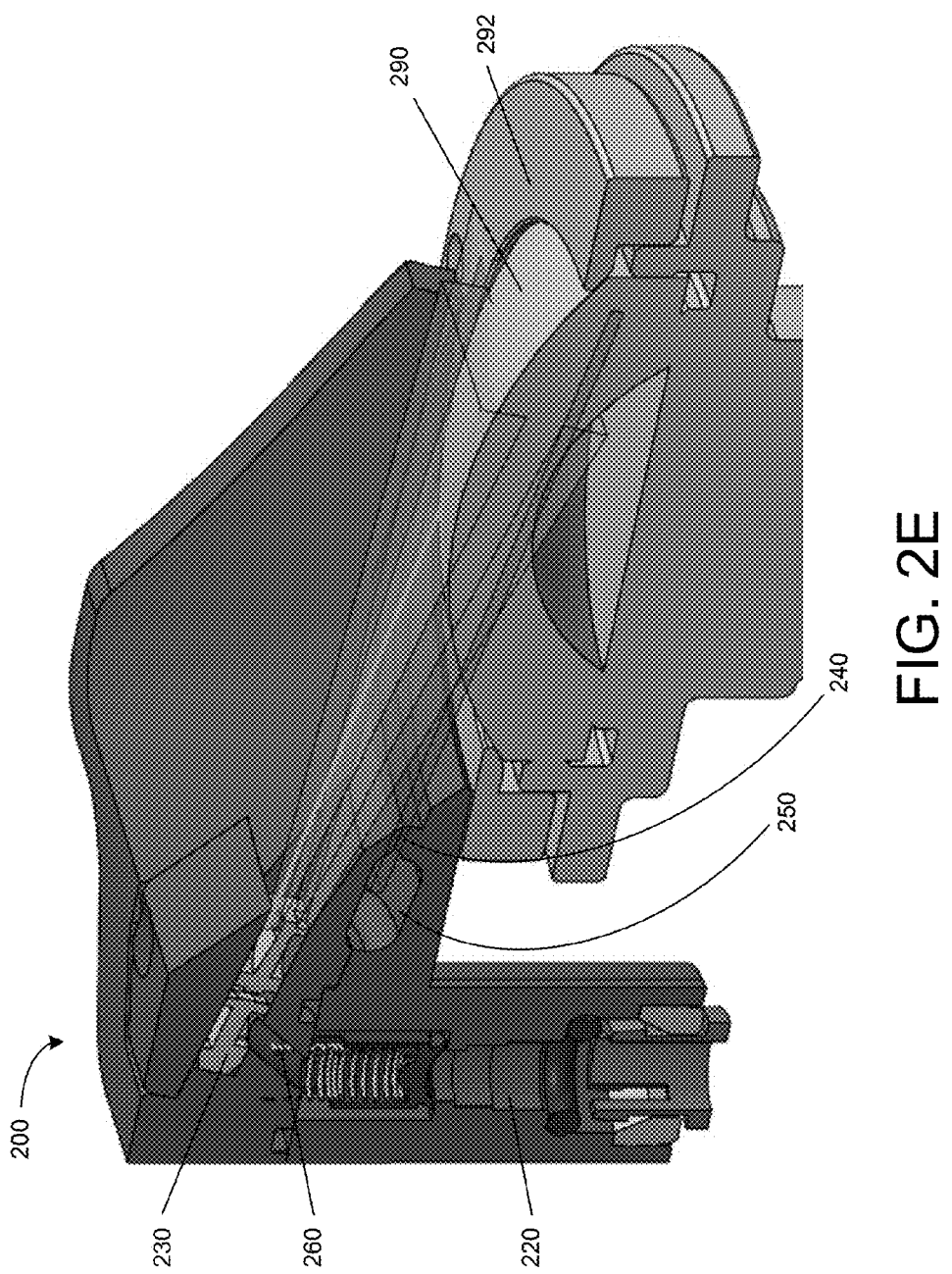

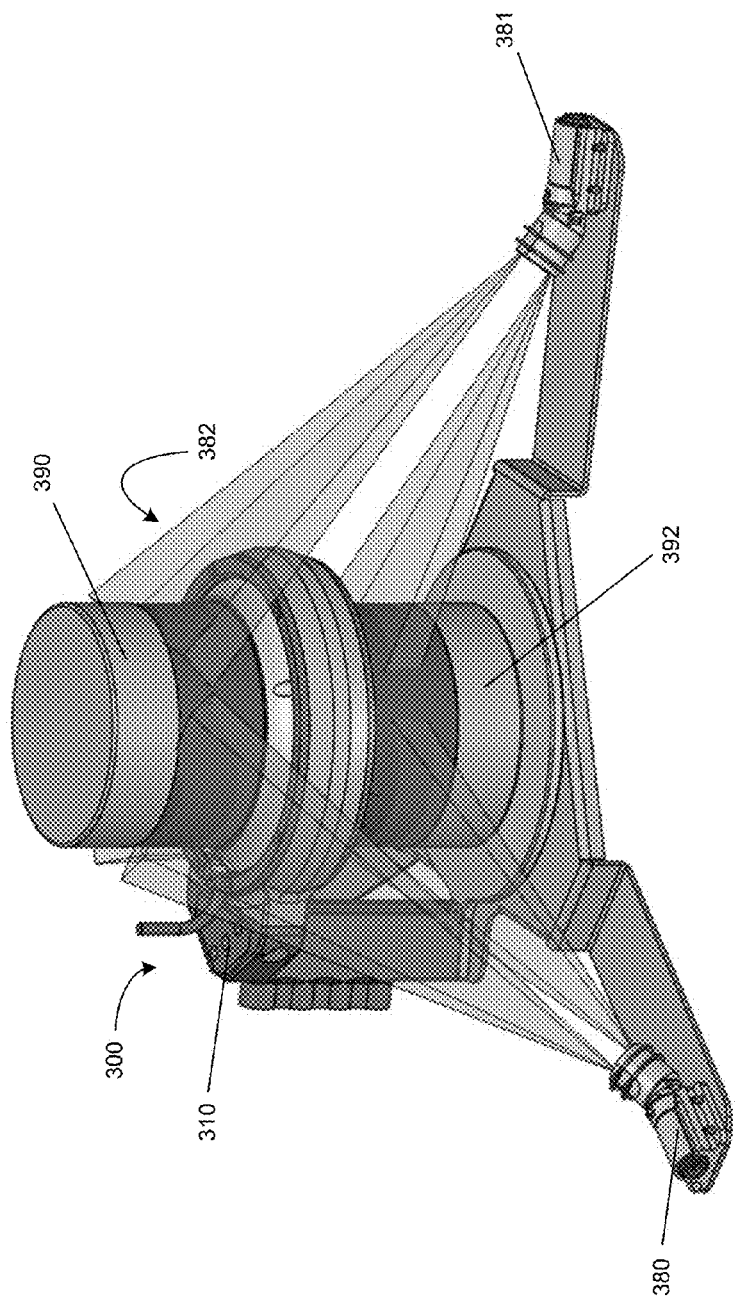

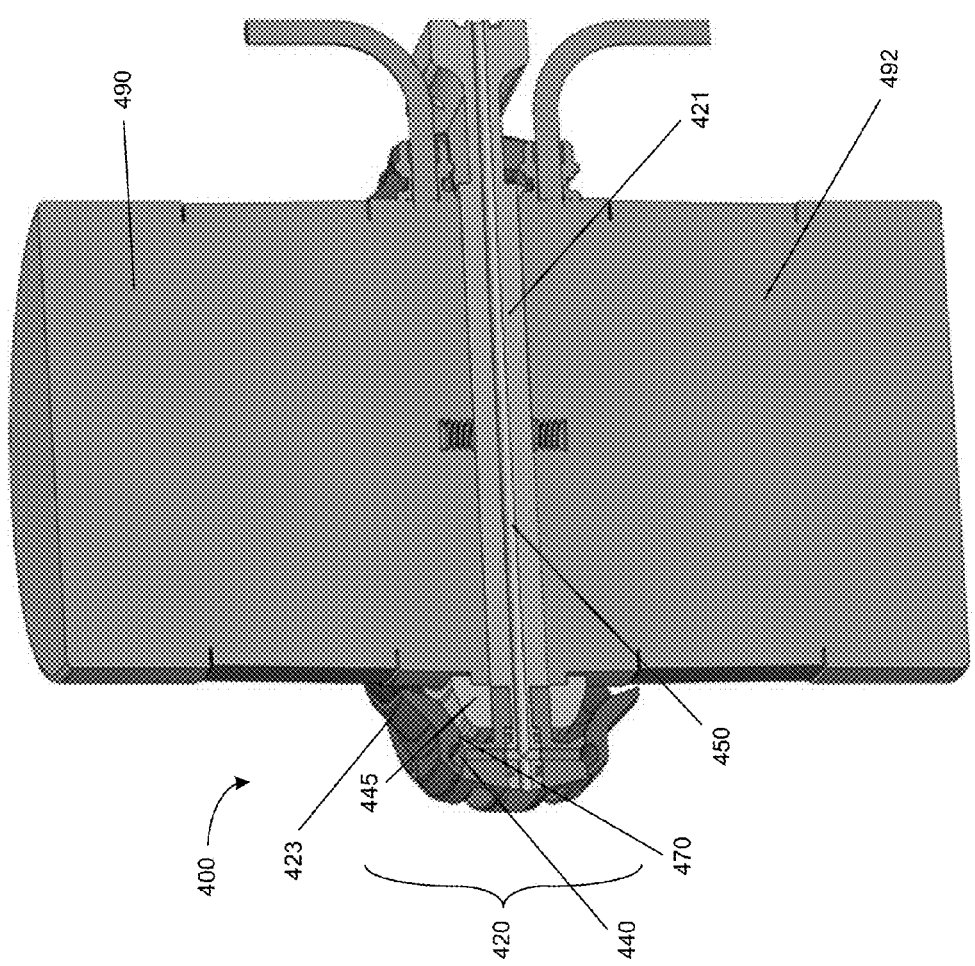

US 10,189,450 B2

SENSOR CLEANING SYSTEM FOR VEHICLES

TECHNICAL FIELD

Examples relate to a sensor cleaning system and devices for vehicles.

BACKGROUND

Autonomous vehicles refer to vehicles which use computer-implemented intelligence and other automation technology to drive and travel on streets and roadways based on input from a plurality of sensors. As a result of an autonomous vehicle driving on roadways in various environmental conditions, the sensors of the autonomous vehicle may become soiled or dirtied by moisture, dirt, particles, etc., thereby reducing their occluding or obstructing parts of the sensors.

BRIEF DESCRIPTION OF THE DRAWINGS

FIG. 2B is cross-sectional view of the sensor cleaning device for a vehicle of FIG. 2A, in one example.

FIG. 2E is a cross-sectional, isometric view of an example sensor cleaning device for a vehicle.

FIG. 3G is an isometric view of a sensor cleaning device for a vehicle, according to an example.

FIGS. 4A and 4B illustrate other examples of portions of a sensor cleaning device for a vehicle, in other variations.

DETAILED DESCRIPTION

Examples described herein include a sensor cleaning system for a vehicle and one or more sensor cleaning devices for the sensor cleaning system. In some examples, the one or more sensor cleaning devices can correspond to a camera cleaning device and/or a light detection and ranging (lidar) cleaning device that are used to clean one or more sensors of the vehicle. For example, the one or more sensors can be a part of an external sensor assembly for use with an autonomous vehicle (AV). As an addition or an alternative, the one or more sensors can be a sensor for use with a human driven vehicle or semi-autonomous vehicle, such as a rear-view camera, a front facing camera, or a radar sensor. A sensor cleaning device can be structured and positioned with respect one or more corresponding sensors to clean the surface of the corresponding sensor using a fluid (such as cleaning fluid or water) and/or air (or another type of gas).

Sensor Cleaning System

Figure 1:
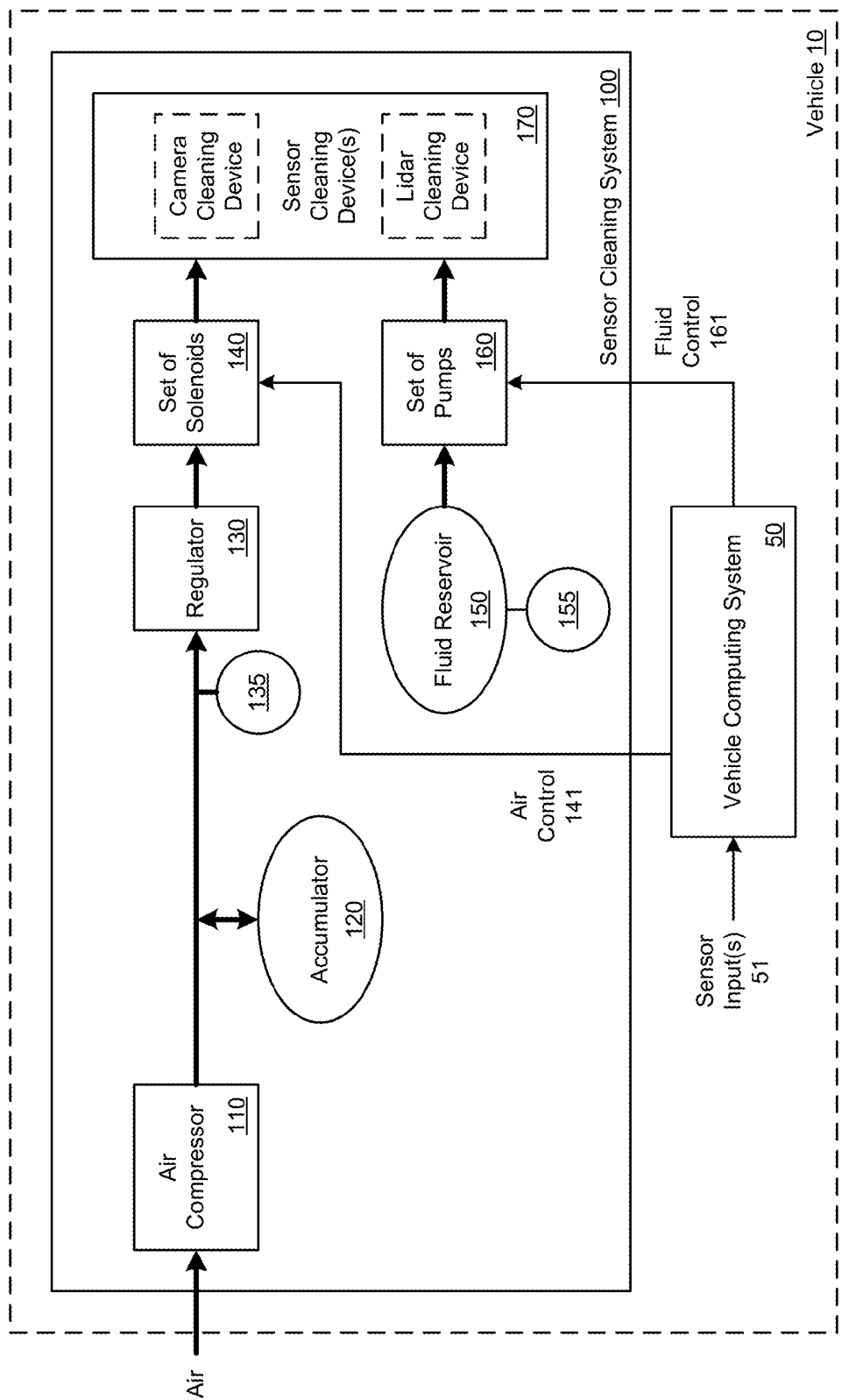
FIG. 1 is a system diagram of the sensor cleaning system for a vehicle, according to some examples.

FIG. 1 illustrates a system diagram of a sensor cleaning system for a vehicle, according to some examples. The sensor cleaning system 100 can be included with or be a part of a vehicle 10. Depending on variations, the vehicle 10 may be a human-driven vehicle, an autonomous vehicle, or a hybrid or semi-autonomous vehicle. In some examples, the components of the sensor cleaning system 100 can be included in or coupled to various parts of the vehicle 10, such as within the body of the vehicle 10 (e.g., under the hood, in the trunk, incorporated with the chassis of the vehicle, etc.) and/or outside the body of the vehicle 10 (e.g., on the roof of the vehicle, on an external surface of the vehicle, etc.).

The vehicle 10 can include a vehicle computing system 50 (e.g., a control system) that communicates with the sensor cleaning system 100. In one example, the vehicle computing system 50 can correspond to an on-board computing system (which includes memory and processing resources) to control various aspects of the vehicle 10. In the context of an AV, the vehicle computing system 50 can be used to autonomously operate the vehicle 10 in a given geographic region for a variety of purposes, including for providing transport services (e.g., transport of humans, delivery services, etc.). The vehicle computing system 50 can utilize specific sensor resources in order to intelligently operate the vehicle 10 in driving situations. For example, the vehicle computing system 50 can control the vehicle 10 based on sensor data or input 51 received from one or more sensors of the vehicle 10.

According to examples, the vehicle 10 can be equipped with multiple types of sensors, which combine to provide a computerized perception of the space and environment surrounding the vehicle 10. By way of example, the sensors can include multiple sets of camera sensors (e.g., single camera, video camera, stereoscopic pairs of cameras or depth perception cameras, long range cameras, etc.), remote detection sensors (e.g., such as provided by radar or lidar, proximity or touch sensors, and/or sonar sensors. The sensors can be dispersed on different positions on the vehicle 10 so as to collectively obtain a complete sensor view of the environment surrounding the vehicle 10, and further to obtain situational information proximate to the vehicle 10, including any potential hazards proximate to the vehicle 10. For example, a set of front facing cameras can be positioned on the roof of the vehicle 10, a set of side facing cameras can be positioned on the roof of the vehicle 10 on a left side and a right side, a lidar can be positioned on the roof 10, a set of cameras can be positioned on the rear bumper, etc.

The vehicle computing system 50 can use the sensor input 51, from one or more sensors, to determine actions to be performed by the vehicle 10 in order for the vehicle 10 to travel along a route to a particular location. In controlling the vehicle 10, the vehicle computing system 50 can use the sensor input 51 to detect the environment the vehicle 10 is operating in and to provide control signals, instructions, and/or data to various vehicle components (not illustrated in FIG. 1 for purposes of simplicity), which can control the steering, accelerating, and braking of the vehicle 10 as the vehicle progresses from one location to another. The vehicle computing system 50 can also control other components of the vehicle 10, such as the headlights, the taillights, the horn, the door locks, the windows, the window wipers, internal cabin control, etc. In some variations, the vehicle computing system 50 can include other functionality, such as wireless communication capabilities, to send and/or receive data communications with one or more remote computing systems that are remote from the vehicle 10 (also not illustrated in FIG. 1 for purposes of simplicity). An example of a remote computing system can correspond to a system that arranges transport services using the vehicles, directs the vehicles to travel to specified locations, and/or monitors the vehicles for errors or problems.

The vehicle computing system 50 can also receive data from and/or send control signals to one or more components of the sensor cleaning system 100 in order to control the sensor cleaning system 100. According to examples herein, the vehicle computing system 50 can transmit one or more control signals to one or more components of the sensor cleaning system 100 to trigger or cause the sensor cleaning system 100 to clean one or more sensors of the vehicle 10, as well as to perform other operations in connection with the sensor cleaning system 100. The vehicle computing system 50 can also receive data from the components of the sensor cleaning system 100, such as operational data from various components or measurement data from sensors (e.g., pressure sensors, temperature sensors, etc.).

In the example of FIG. 1, the sensor cleaning system 100 can include an air compressor 110, an accumulator 120, a regulator 130, a set of solenoids (or solenoid valves) 140, a fluid reservoir 150, a set of pumps (or fluid pumps) 160, and a set of sensor cleaning devices 170. As an addition or an alternative, the sensor cleaning system 100 can include one or more sensors, such as a pressure sensor 135 and/or a liquid level sensor 155, which provide measurement data to the vehicle computing system 50. In some examples, the sensor cleaning system 100 can include other components, such as a coalescing filter, a membrane dryer, a pressure switch, other valves (e.g., a check valve, a pop-off valve), other pressure sensors, and/or temperature sensors. The vehicle computing system 50 can communicate with the sensor cleaning system 100 to (i) provide a set of air control signals 141 to the set of solenoids 140 to cause a set of sensor cleaning devices 170 to output air and/or (ii) provide a set of fluid control signals 161 to a set of pumps 160 to cause a set of sensor cleaning devices 170 to output fluid. As referred to herein, "a set" can correspond to one or more of a listed item.

The vehicle computing system 50 can also provide controls to the air compressor 110, the regulator 130, and/or other components of the sensor cleaning system 100 to cause the respective components to perform an operation, such as to activate the air compressor 110 to compress and store air in an accumulator 120 and/or to activate the regulator 130 to control the output of air from the accumulator 120 (e.g., control the amount of pressure outputted, such as in pounds per square inch or PSI) to the set of solenoids 140. As an addition or an alternative, the air compressor 110 and/or the regulator 130 can automatically be activated based on detecting certain conditions, such as based on the pressure or amount of air in the accumulator 120 and/or based on a pressure sensor 135, respectively. In some examples, in response to detecting measurements of pressure or fluid volume/levels that are below or above a threshold measurement, the vehicle computing system 50 can activate indicator lights within the vehicle 10 and/or communicate data in connection with the detected measurements to a remote system.

The sensor cleaning system 100 can store compressed air in the accumulator 120 (e.g., such as in an air tank) and can store fluid, such as cleaning fluid or water, in the fluid reservoir 150. In examples described herein, the sensor cleaning devices 170 can use both air and fluid in order to clean the respective sensors of the vehicle 10. The air compressor 110 can take in outside air through a set of vents on the vehicle 10, compress the air, and store the compressed air in the accumulator 120 via a set of tubing (or hoses), such as a 6 mm tubing (e.g., such as tubing approved by the Department of Transportation, or DOT). The accumulator 120 can store the compressed air at a PSI of 140 to 160, in one example. If the PSI amount decreases below a threshold (e.g., less than 130 or 140 PSI), the air compressor 110 can be triggered (e.g., automatically itself or by the vehicle computing system 50) to be activated to compress more air and store the compressed air in the accumulator 120. In an alternative example, rather than having an air compressor 110 and an accumulator 120, the sensor cleaning system 100 can use replaceable, pressurized air tanks that can be installed and removed when the air is depleted.

The regulator 130 can regulate or control the amount of compressed air that is released or outputted from the accumulator 120. For example, the regulator 130 can dial out (e.g., increase or decrease) the appropriate amount of PSI of air from the accumulator 120, via a set of tubing, based on optimal measurements for cleaning the sensors. According to variations, the accumulator 120 and the regulator 130 can be stored in, for example, the trunk of the vehicle 10, under a seat in the cab of the vehicle 10, or in the hood of the vehicle 10.

Still further, in some examples, the sensor cleaning system 100 can include a set of solenoids 140 to control the flow of air to the sensor cleaning devices 170. The set of solenoids 140 (or a solenoid manifold) can correspond to an array of individual solenoid valves that each enable air to flow through a respective tube, such as a quarter-inch tubing (e.g., a DOT or poly tube), that connects to the sensor cleaning devices 170. For example, in one implementation, the sensor cleaning system 100 can include seven camera cleaning devices that are each connected to an individual solenoid (of the set of solenoids 140) via a respective tube (e.g., seven tubes for the seven camera cleaning devices). In addition, depending on implementation, the sensor cleaning system 100 can include a lidar cleaning device that is connected to a single solenoid via a single tube or connected to a sub-set of solenoids (e.g., five solenoids of the set of solenoids 140) via a set of tubes (e.g., five tubes for the single lidar cleaning device).

Each individual solenoid valve can be controlled by an electric current or signal through the respective solenoid in order to enable or disable the flow of air through the solenoid valve (e.g., turn on air flow or turn off air flow). When a first solenoid valve that is connected to a first camera cleaning device is turned on, compressed air can flow through the first solenoid valve and through the respective tube connected to the first solenoid valve and the first camera cleaning device. The first camera cleaning device can include other components to enable the air to exit the first camera cleaning device (e.g., via a slot opening or air knife) in order to clean (with air) the respective camera. Similarly, a second solenoid valve can be connected to a second camera cleaning device via a respective tube, so that when the second solenoid valve is turned on, compressed air can flow to the second camera cleaning device. The vehicle computing system 50 can determine which of the one or more solenoid valves to activate or turn on in order to clean the corresponding sensors (e.g., concurrently clean multiple sensors, or clean multiple sensors in a sequence, etc.) and transmit a set of air control signals 141 to the set of solenoids 140. In addition, although the sensor cleaning system 100 uses solenoid valves in examples herein, in other examples, different types of valves or switches can be used instead, such as hydraulic, pneumatic, or mechanical valves or switches, to enable or disable air to flow through individual tubes to the sensor cleaning devices 170.

Still further, in one example, the set of solenoids 140 can be connected to a pressure sensor, which can detect if there is a leak between the regulator 130 and the set of solenoids 140 (e.g., the air pressure should be at a particular level, such as 70-90 PSI). In this manner, the vehicle computing system 50 can determine whether the amount of pressure is less than a threshold level, and if it is, can output an indicator light and/or transmit a communication to the remote computing system.

According to various examples, the set of solenoids 140 can be coupled to a primary sensor assembly of the vehicle 10 (which can be provided on the roof of the vehicle 10) and/or be positioned within the primary sensor assembly housing on the roof of the vehicle 10, or be in another portion of the vehicle (e.g., the trunk). In the former example, by positioning the set of solenoids 140 with the sensor assembly, the amount of tubing required to connect the set of solenoids 140 to the set of sensor cleaning devices can be reduced, thereby better maintaining the amount of PSI from a solenoid valve to the respective sensor cleaning device and/or reducing the amount of surface area of the tubes that can be potentially damaged (e.g., reduce chance of breakage or rupture of the tube).

Still further, the sensor cleaning system 100 can include a fluid reservoir 150 to store fluid for cleaning the sensor(s) of the vehicle 10. The fluid reservoir 150 can be connected to a set of pumps 160 (e.g., a pump bank) via a set of tubes. Individual pumps of the set of pumps 160 can be activated to pump fluid from the fluid reservoir 150 through a respective tube to a corresponding sensor cleaning device. For example, in one implementation, the sensor cleaning system 100 can include seven camera cleaning devices that are each connected to an individual pump (of the set of pumps 160) via a respective tube (e.g., seven tubes for the seven camera cleaning devices). In addition, depending on implementation, the sensor cleaning system 100 can include a set of nozzle devices (e.g., three nozzle devices) for cleaning a lidar(s), where each nozzle device is connected to a pump via a tube. The sensor cleaning devices (e.g., camera cleaning device and/or the nozzle device) can each include a set of fluid nozzles that are connected to a respective pump via a tube so that when that pump is activated, fluid can be pushed through the tube to the set of fluid nozzles and ejected from the set of fluid nozzles with a force to hit a surface of the corresponding sensor. The vehicle computing system 50 can determine which of the one or more pumps of the set of pumps 160 to activate or turn on in order to clean the corresponding sensors with fluid (e.g., concurrently clean multiple sensors, or clean multiple sensors in a sequence, etc.) and transmit a set of fluid control signals 161 to the set of pumps 160.

In addition, in one example, the fluid reservoir 150 can be connected to a liquid level sensor 155 to measure the amount of fluid stored in the fluid reservoir 150, and provide an indication signal to the vehicle computing system 50. If the amount of fluid is less than a threshold level, the vehicle computing system 50 can output an indicator light and/or transmit a communication to the remote computing system, so that an operator of the vehicle 10 can add more fluid to the fluid reservoir 150. The fluid reservoir 150 can also be stored in the trunk of the vehicle, or positioned on the roof of the vehicle (e.g., inside the housing of the primary sensor assembly, or incorporated within the roof of the vehicle, etc.), depending on implementation.

Camera Cleaning Device

FIGS. 2A through 2E illustrate various examples of a sensor cleaning device of a vehicle, such as a sensor cleaning device 170 of FIG. 1. In particular, the examples of FIGS. 2A through 2E correspond to a camera cleaning device (or a lens cleaning device) of the vehicle 10. While examples described with FIGS. 2A through 2E illustrate a camera cleaning device having a housing structure with a specific shape, it is contemplated that other examples of the camera cleaning device can have differently shaped housing structures.

Figure 2A:
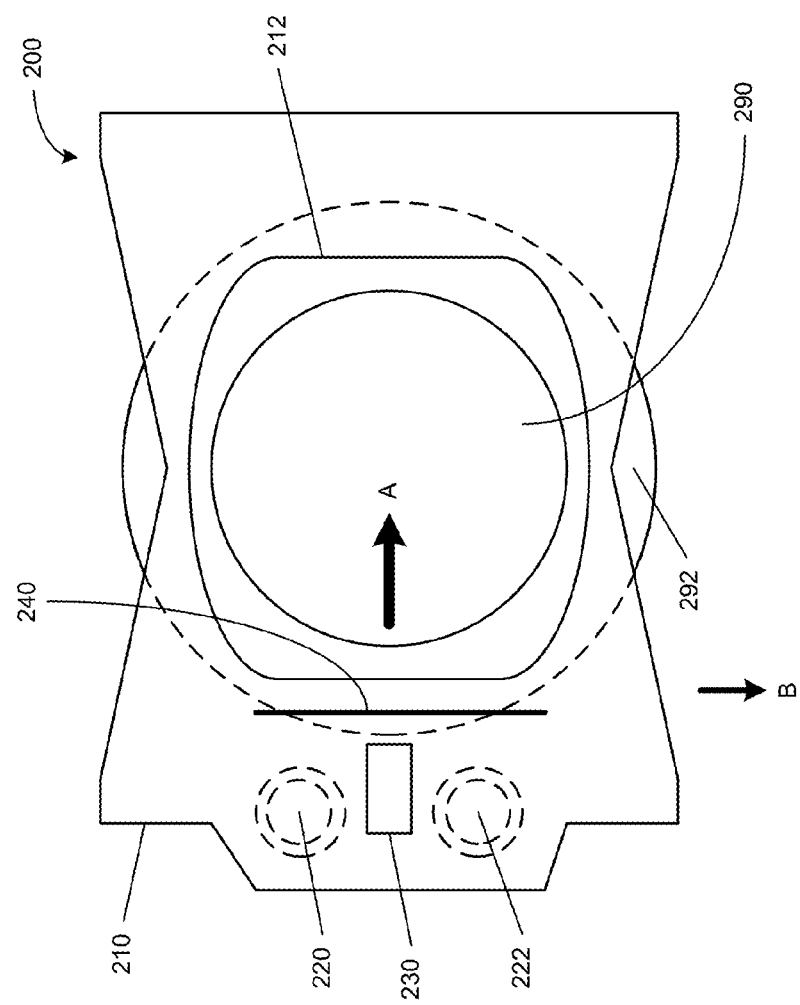
FIG. 2A is a front view of a sensor cleaning device for a vehicle, in one example.

Referring to FIGS. 2A and 2B, a camera cleaning device 200 can include a housing structure 210, a first valve 220, a second valve 222, a set of fluid nozzles 230, and a slit opening 240 (also referred to herein as an air knife). The camera cleaning device 200 can be positioned adjacent to and/or coupled to the camera in a manner so that the camera lens 290 is not occluded or obstructed by the housing structure 210. For example, the housing structure 210 can be coupled to the camera (e.g., coupled to the camera ring structure 292 that encircles the lens 290) via one or more coupling mechanisms, or can be formed as part of the camera ring structure 292 or another structure of the camera, depending on implementation. The housing structure 210 can be formed to include a central opening 212 so that the camera lens 290 is not obstructed by the housing structure 210.

The camera cleaning device 200 can enable fluid and air to be ejected or sprayed to clean the respective camera lens 290. FIG. 2A illustrates a front view of the camera cleaning device 200, with the camera being positioned to face outward from the vehicle 10 (e.g., the camera is pointing forward, backwards, or to a side). In the example of FIG. 2A, when the camera cleaning device 200 is activated to clean the sensor, the fluid and/or air is ejected in the A direction (illustrated by the thick arrow), from a proximate region of the lens 290 towards a distant region of the lens 290 (e.g., from side to side). The proximate region of the lens 290 corresponds to the region closer to the set of fluid nozzles 230 and the slit opening 240. The camera cleaning device 200 can be positioned in this manner so that if there is any excess fluid (or combination of fluid and dirt or debris) that remains on the lens after cleaning, the excess fluid can drip downwards (via gravity) in the B direction (illustrated by the thinner arrow).

Referring to FIG. 2B, which illustrates a side, cross-sectional example view of the camera cleaning device 200, the housing structure 210 can be structured to house the first valve 220 and the second valve 222 (not shown in FIG. 2B for simplicity), and structured to form the slit opening 240. Depending on implementation, the housing structure 210 can be modular and formed of multiple housing components, or can be designed and formed from a solitary piece of material (e.g., plastic, metal, ceramic, etc.).

In one example, the first valve 220 can have a first end and a second end, where the first end is connected to a tube (which is connected to a respective pump, such as described in FIG. 1) and the second end is connected to a first channel 260. The first valve 220 can correspond to a check valve, for example, which allows fluid to move from the first end to the second end and exit the check valve to the first channel 260 when sufficient pressure from the fluid is built up from the first end to the second end (e.g., when the respective pump is activated to move fluid from the fluid reservoir to the respective camera cleaning device 200). When fluid moves through the first valve 220, the fluid can move through the first channel 260 and eject out of the set of fluid nozzles 230 in a direction illustrated in FIG. 2B.

The second valve 222 can also have a first end and a second end, where the first end if connected to a tube (which is connected to a respective solenoid valve, such as described in FIG. 1) and the second end is connected to a second channel 270. The second valve 222 can also correspond to a check valve, in one example, which allows air or gas to move from the first end to the second end and exit the check valve to the second channel 270 when sufficient pressure from the air is built up from the first end to the second end (e.g., when the respective solenoid valve is activated to move air from the accumulator to the respective camera cleaning device 200). When air moves through the second valve 222, the air can move through the second channel 270 and to a cavity 250 (or an expansion chamber). The housing structure 210 can be formed to include a cavity 250 that is connected to the slit opening 240, or alternatively, can include a small container that can fill up with air. The cavity 250 enables air to fill up, thereby increasing in pressure within the cavity 250, and when sufficient pressure is built up, enables the air to eject out of the slit opening 240 in a direction illustrated in FIG. 2B. In some examples, the slit opening 240 can be an opening having a substantially larger length than width, such as three inches by two-tenths of an inch (e.g., as illustrated in FIG. 2A), so as to enable air to eject out the slit opening 240 with sufficient force in order to clean the lens 290.

According to some examples, the housing structure 210 can include the first valve 220 and/or the second valve 222 as part of an integrated check valve and push-to-connect fitting/cartridge. Still further, depending on implementation, the first channel 260 and/or the second channel 270 can be formed from the housing structure 210 (e.g., the housing structure 210 can be molded or structured to define the first channel 260 and/or the second channel 270) or can correspond to a tube within the housing structure 210.

Figure 2C:
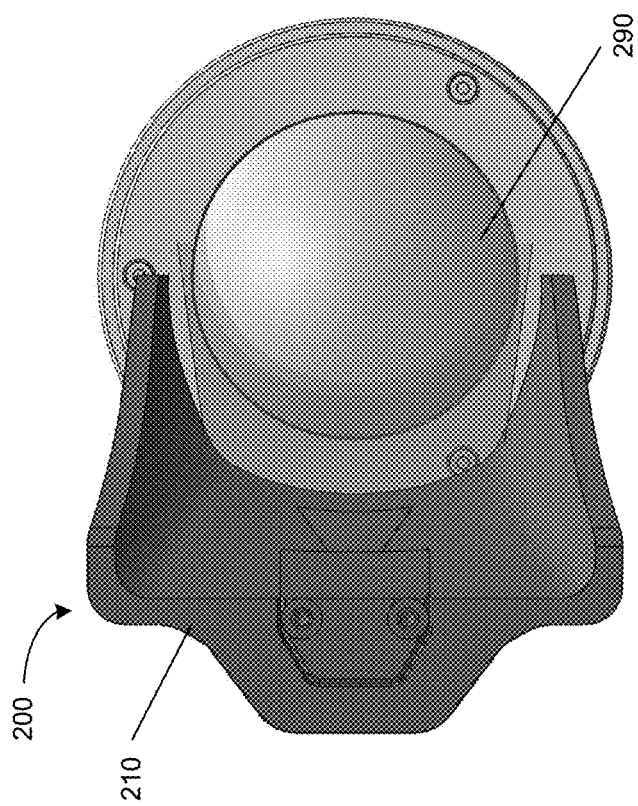
FIGS. 2C and 2D are front view of an example sensor cleaning device for a vehicle.
Figure 2D:
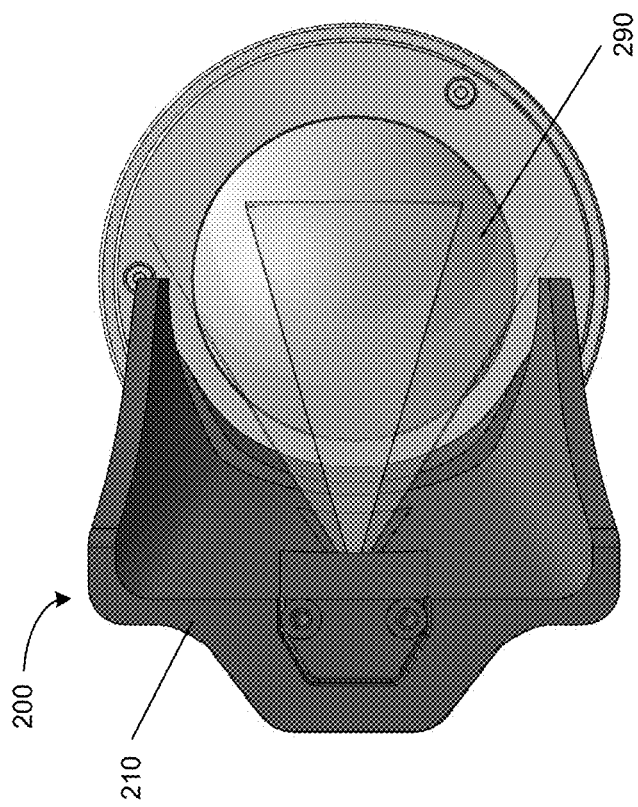

FIGS. 2C through 2E illustrate an example operation of the camera cleaning device 200. For example, FIGS. 2C and 2D illustrate a front view of the camera cleaning device 200, while FIG. 2E is a cross-sectional, isometric view of an example camera cleaning device 200. FIG. 2C illustrates a cut-away portion of the camera cleaning device 200 when the fluid cleaning operation of the camera cleaning device 200 is activated. The fluid can be ejected in a direction that is angled towards the lens 290 of the camera (e.g., see FIG. 3E), and that starts from a proximate region of the lens 290 towards a distant region of the lens 290 (in this example, from the left side to the right side). When the fluid cleaning operation is activated, fluid can pass through the first valve 220, through the first channel 260, and exit out the set of fluid nozzles 230. As shown in the example of FIGS. 2C and 2E, the fluid nozzle 230 can be angled towards the lens 290 and can include multiple fluid outputs—in this example, there are two fluid outputs that enable different portions of the lens 290 to be washed simultaneously (e.g., as the individual fluid outputs may be angled slightly differently from each other). In alternate examples, there can be multiple fluid nozzles 230 and/or more or less than two fluid outputs. Still further, in one variation, the fluid nozzle 230 can be pivotably coupled to a recess in the housing structure 210 so as to slightly pivot about a vertical axis (when referring to FIG. 2C) when fluid is being ejected out the fluid nozzle 230.

FIG. 2D illustrates a cut-away portion of the camera cleaning device 200 when the air cleaning operation of the camera cleaning device 200 is activated. The air can be ejected in a direction that is also angled towards the lens 290 of the camera (e.g., see FIG. 3E), and that starts from the proximate region of the lens 290 towards the distant region of the lens 290 (in this example, again, from the left side to the right side). When the air cleaning operation is activated (e.g., such as just after completion of the fluid cleaning operation—so as to first clean the lens 290 with fluid and then dry and blow off excess fluid or dirt/debris with air), air can pass through second valve 222 and the second channel 270, fill the cavity 250, and exit out the slit opening 240.

Lidar Cleaning Device

FIG. 3A through 3H illustrate various examples of a sensor cleaning device of a vehicle, such as a sensor cleaning device 170 of FIG. 1. In particular, FIG. 3A through 3H illustrate example lidar cleaning devices that can be included in the sensor cleaning system 100 of the vehicle 10.

Figure 3A:
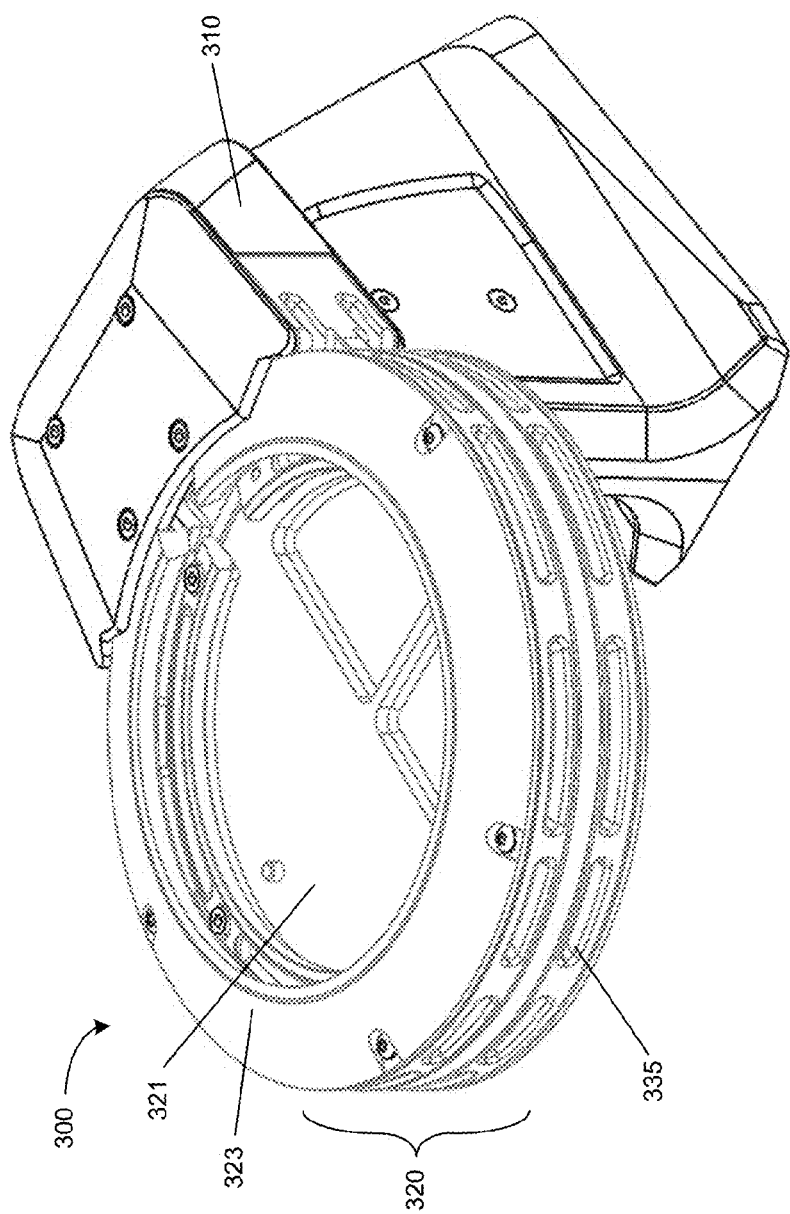
FIG. 3A is an isometric view of a sensor cleaning device for a vehicle, according to an example.

FIG. 3A is an isometric view of an example lidar cleaning device 300. The lidar cleaning device 300 can include a support structure 310 that includes or houses a first set of channels or tubes (not shown in FIG. 3A) to enable airflow from a respective set of solenoid valves of the sensor cleaning system 100. The lidar cleaning device 300 can also include a platform assembly 320 that includes a platform structure 321 that is coupled to the support structure 310. The platform assembly can include a raised lip structure 323 that is provided around at least a portion of the perimeter of the platform structure 321, and in some examples, can include a set of openings 335. The platform assembly 320 can hold and/or support a lidar sensor and can eject air to clean the surface of the lidar sensor.

Figure 3B:
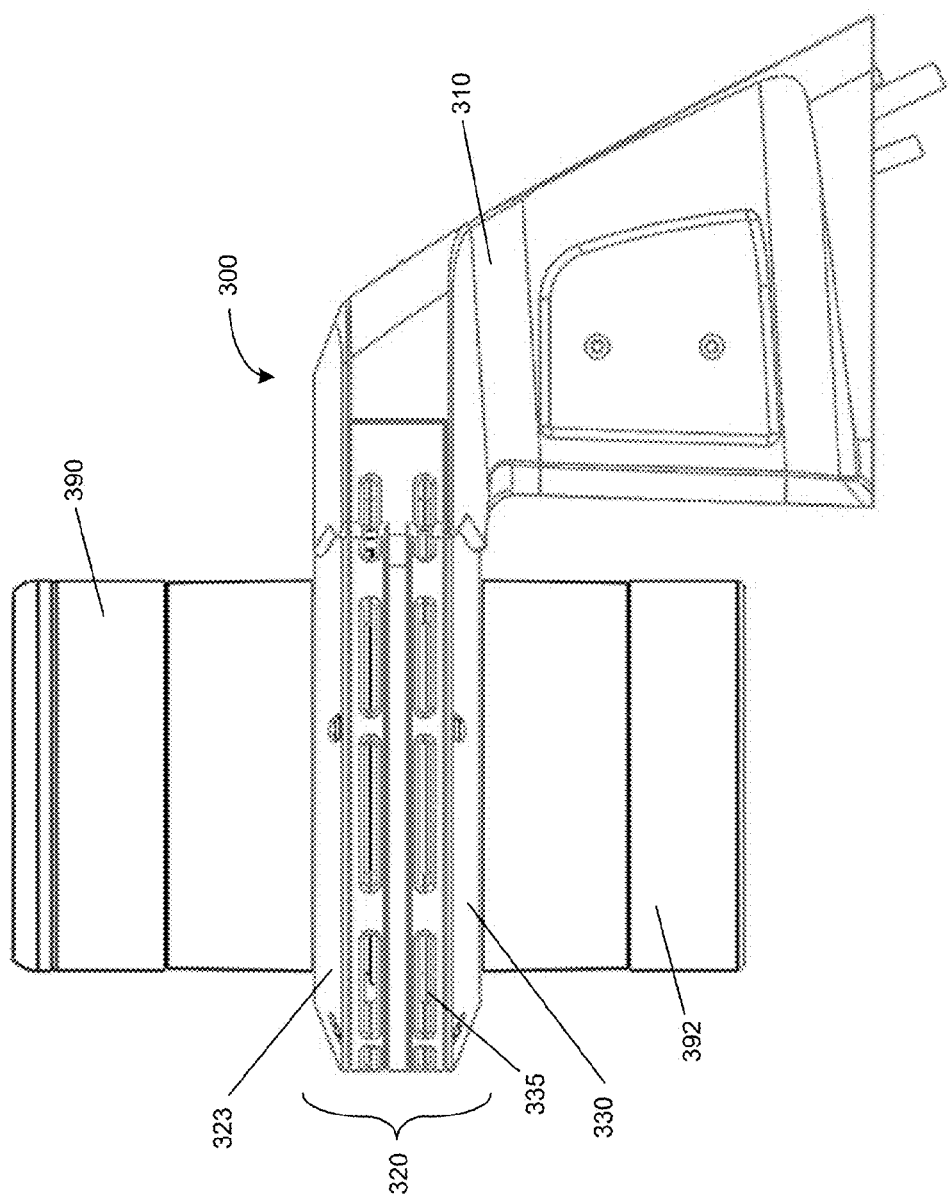
FIG. 3B is a side view of a sensor cleaning device for a vehicle, according to an example.

For example, FIG. 3B illustrates the lidar cleaning device 300 coupled to two lidar sensors—a first lidar sensor 390 and a second lidar sensor 392. In such an example, the platform assembly 320 can include a first raised lip structure 323 and a second raised lip structure 330. In one example, the lidar cleaning device 300 can clean at least portions of the two lidar sensors simultaneously by ejecting air in a direction upwards and towards the first lidar sensor 390 and in a direction downwards and towards the second lidar sensor 392. While examples described herein illustrate the lidar cleaning device 300 being coupled to two lidar sensors, in other examples (such as in the example of FIG. 3H), the lidar cleaning device 300 can be coupled to a single lidar sensor. For example, in FIG. 3H, the lidar cleaning device 300 is structured to have a platform assembly 320 to clean a single lidar sensor.

Figure 3C:
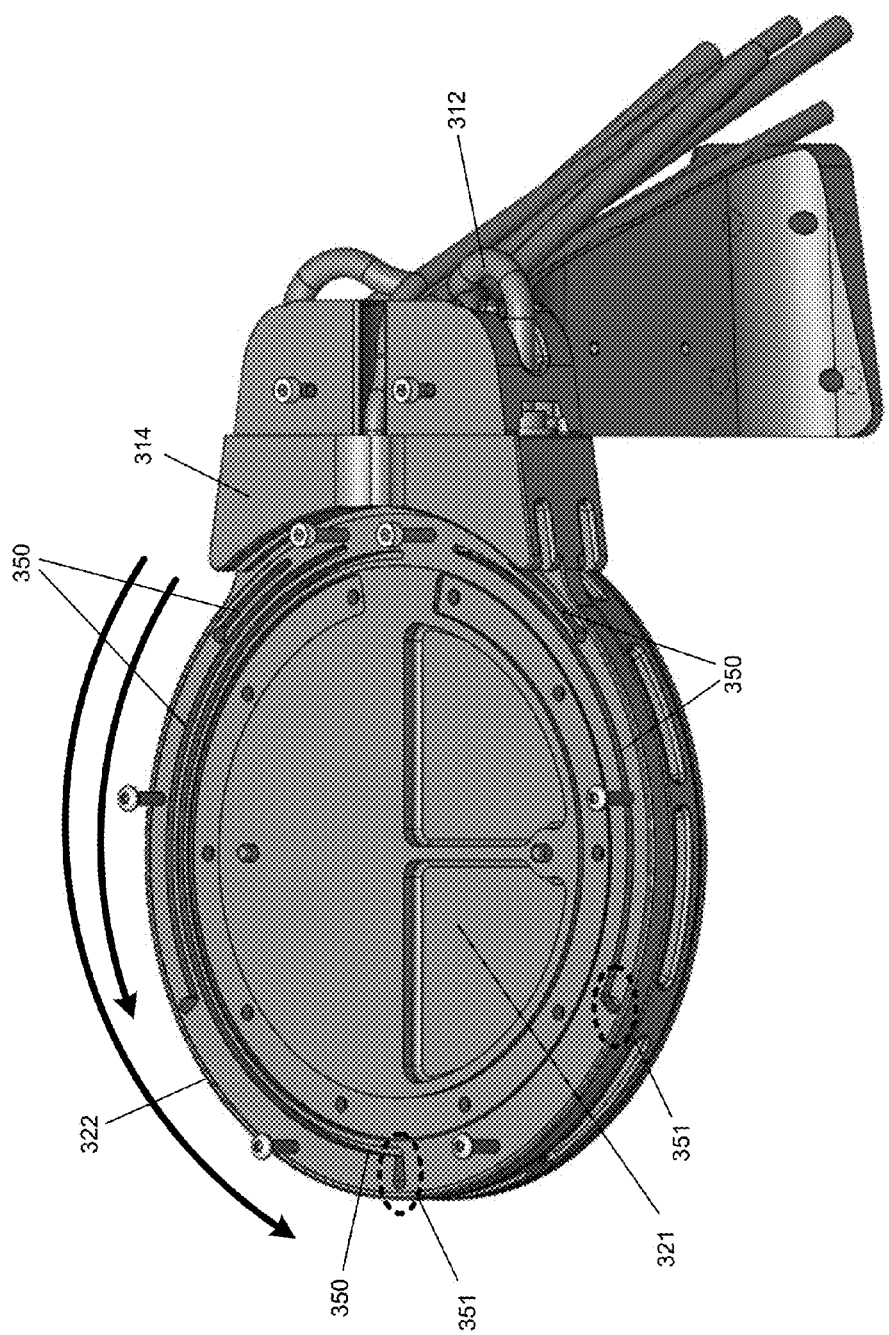
FIG. 3C illustrates a portion of a sensor cleaning device for a vehicle, in one example.

In some examples, the platform assembly 320 can include a second set of channels or tubes that is connected to the first set of channels or tubes in the support structure 310. For example, FIG. 3C illustrates the platform structure 321 having a defined perimeter 322 (e.g., defined in the shape of a large arc or a circle with an extension portion 314 to couple to the support structure 310) and a second set of channels 350 that are etched or grooved into the platform structure 321. In the example of FIG. 3C, the second set of channels 350 are provided in the first face (or upper face) of the platform structure 321 and are dispersed substantially around a region close to the perimeter 322 of the platform structure 321. Alternatively, the second set of channels 350 can correspond to tubes that are included or coupled to the platform structure 321. The second set of channels 350 can also be connected to the first set of channels or tubes 312 of the support structure 310 (illustrated in FIG. 3C).

As an addition or an alternative, in examples where a second lidar sensor is coupled to the lidar cleaning device 300, the platform structure 321 can also include a third set of channels that are provided in the second face (or lower face) that opposes the first face, in a similar fashion as the second set of channels 350 being provided in the first face, so that the positions of the channels on each face can substantially mirror each other. The third set of channels can also be connected to the first set of channels or tubes 312. In such examples, the extension portion 314 of the platform structure 321 can include a set of internal channels or tubes (e.g., five tubes) that the second and third sets of channels of the platform structure 321 can connect to. The internal channels or tubes can then connect to the first set of channels or tubes 312 of the support structure 310. Accordingly, individual pairs of channels from each of the second set and third set can then connect and merge into a respective internal channel or tube of the extension portion 314—e.g., a first channel from the second set on the first face of the platform structure 312 and a first channel from the third set on the second face of the platform structure 312 can connect and merge to a first internal channel or tube in the extension portion 314, and so on. In this manner, when air is forced out from a solenoid valve through a respective channel of the first set, air can move through the respective internal channel in the extension portion 314 and through both a respective channel of the second set and a respective channel of the third set simultaneously. In an alternate example, each channel of the second set and the third set can connect to an individual channel of the first set via an individual internal channel so that air flow from a solenoid valve through a respective channel of the first set causes air to only move through a respective channel of either the second or third set.

For purposes of illustration, the second set of channels 350 are shown to be exposed in the example of FIG. 3C. However, the platform assembly 320 is constructed or built so that the individual channels of the platform structure 321 enable air to flow from a first end (e.g., the end that connects to a respective internal channel of the extension portion 314 and/or to a respective channel 312 of the support structure 310) to a second end 351 in the direction shown in FIG. 3C. The platform structure 321 can couple to the raised lip structure 323 (or one or more components that form the raised lip structure 323) so that the individual second ends 351 (in this example, five ends 351 of five channels 350) align with respective channels and/or cavities of the raised lip structure 323 to enable air to move into and out the raised lip structure 323 when the lidar cleaning device 300 is in operation to clean the respective lidar.

Figure 3D:
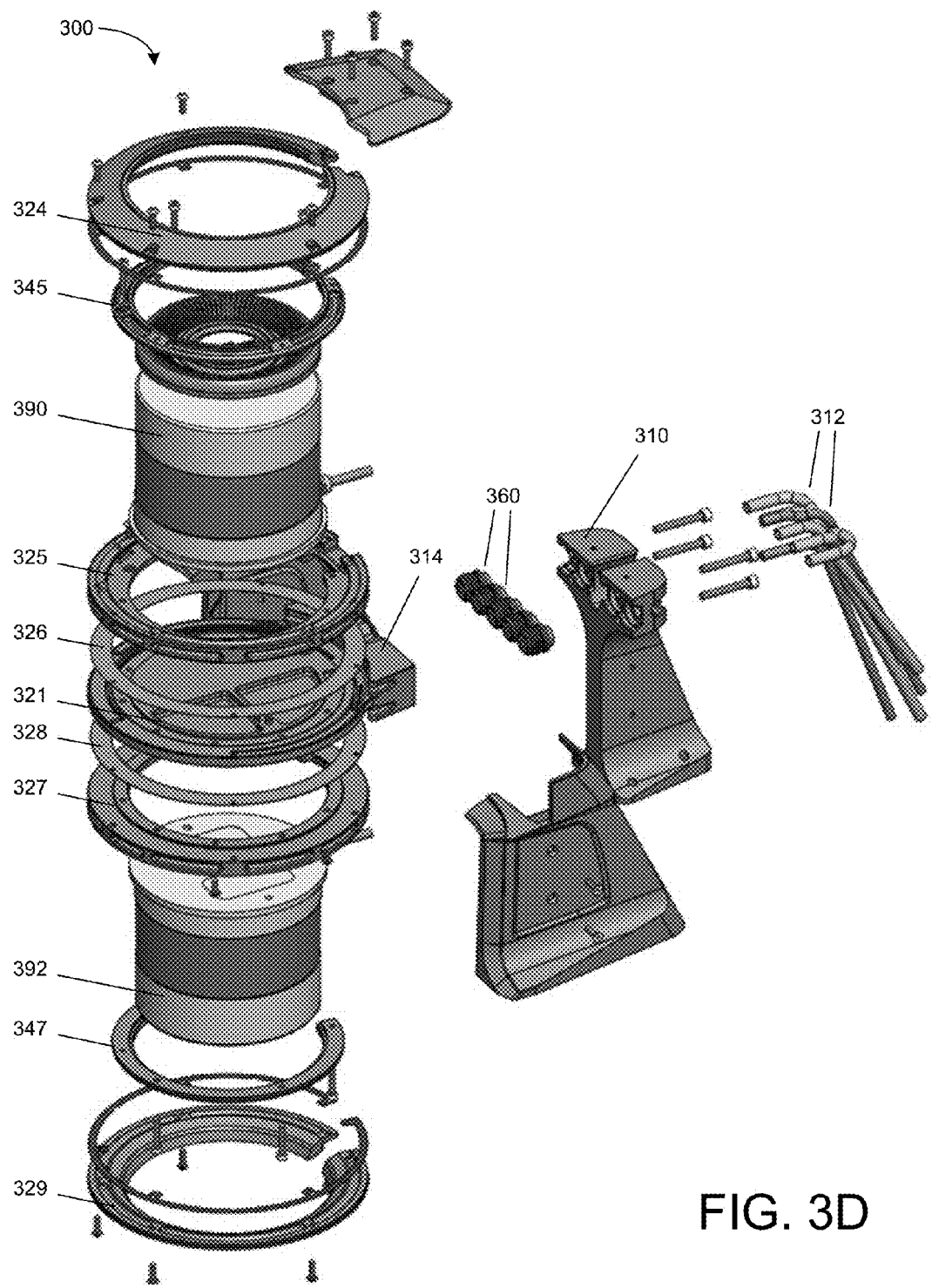
FIG. 3D illustrates an exploded view of a sensor cleaning device for a vehicle, according to some examples.
Figure 3E:
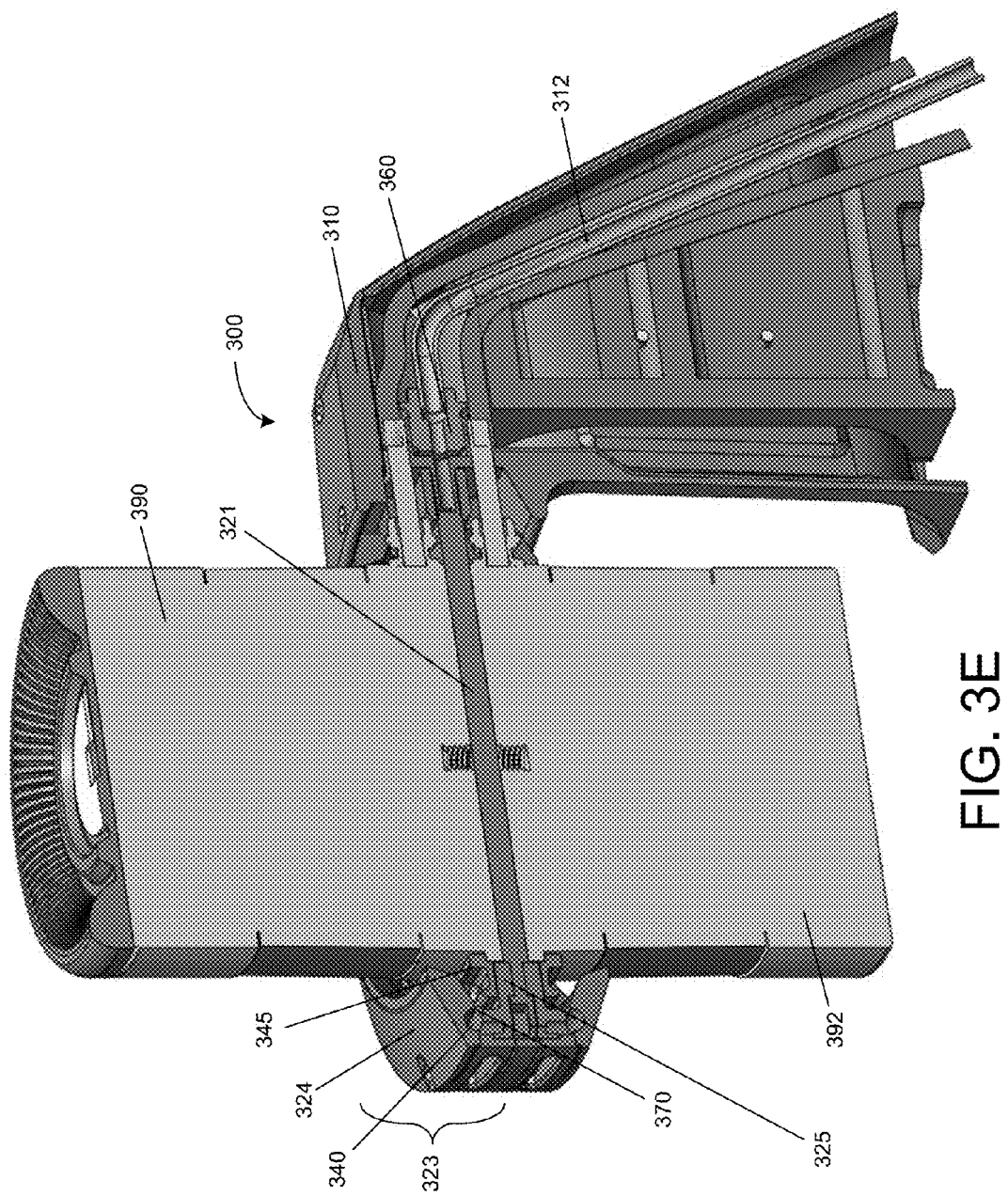
FIG. 3E is a cross-sectional, isometric view of the sensor cleaning device for a vehicle of FIG. 3B, in one example.

Depending on implementation, the raised lip structure 323 can be modular and formed of multiple components, or can be designed and formed from a solitary piece of material (e.g., plastic, metal, ceramic, etc.). For example, FIG. 3D illustrates an exploded view of the lidar cleaning device 300. In the example of FIG. 3D, the support structure 310 and the platform assembly 320 can be formed of multiple components. The support structure 310 can include a first set of channels or tubes 312 (five, in this example, but can include more or less in other examples) that each couple to a respective valve or a set of valves 360 (e.g., check valves). The platform assembly 320 can include a platform structure 321 and a raised lip structure 323 that further includes (i) a first lip structure 324 and (ii) a first raised structure 325. The raised lip structure 323 can also include one or more gaskets, such as a first gasket 326. For example, the first gasket 326 can be inserted between the platform structure 321 and the first raised structure 325 so as to enable air to move through the second set of channels 350 and upwards through the raised structure 325, while substantially preventing air from escaping out of the platform assembly 320 elsewhere. The first lip structure 324 can be coupled to the first raised structure 325 (and in some examples, a gasket can be inserted between the first lip structure 324 and the first raised structure 325).

The raised lip structure 323 can include a set of channels and/or cavities that connects to the second set of channels of the platform structure 321. For example, referring to FIG. 3E, the combination of the first lip structure 324 and the first raised structure 325 can form a set of cavities 340 and a set of slit openings (or air knives) 370 (e.g., for five channels, there can be five corresponding cavities and five corresponding slit openings). In this manner, when air is forced out from a solenoid valve through the respective channel or tube 312, through the respective valve 360, and through the respective channel (or channels) of the platform structure 321, the air then moves through the respective channel of the raised lip structure 323 and into a respective cavity 340. When sufficient air pressure is present in the respective cavity 340, the air can be ejected out the respective slit opening 370 and toward the lidar sensor 390 coupled to the lidar cleaning device 300. According to some examples, the platform assembly 320 can also include an inner raised lip structure 345 that is positioned under the interior portion of the raised lip structure 323. The inner raised lip structure 345 can be shaped to help move the air that comes out from the set of slit openings 370 in a direction upwards and towards the surface of the lidar sensor 390.

Referring back to FIG. 3D, the lidar cleaning device 300 can also clean a second lidar sensor 392. The bottom portion of the platform assembly 320 can be similarly constructed as the top portion of the platform assembly 320. For example, the platform assembly 320 can further include a second raised lip structure 330 that includes (i) a second lip structure 329 and (ii) a second raised structure 327. The second raised lip structure 330 can also include one or more gaskets, such as a second gasket 328. For example, the second gasket 328 can be inserted between the platform structure 321 and the second raised structure 327 so as to enable air to move through the third set of channels 352 and downwards through the second raised structure 327, while substantially preventing air from escaping out of the platform assembly 320 elsewhere. The second lip structure 329 can be coupled to the second raised structure 327 (and in some examples, a gasket can be inserted between the second lip structure 329 and the second raised structure 327). The combination of the second lip structure 329 and the second raised structure 327 can form a second set of cavities and a second set of slit openings (or air knives). The platform assembly 320 can also include a second inner raised lip structure 347 that is positioned under the interior portion of the second raised lip structure 330. The second inner raised lip structure 347 can be shaped to help move the air that comes out from the second set of slit openings in a direction downwards and towards the surface of the lidar sensor 392.

Figure 3F:
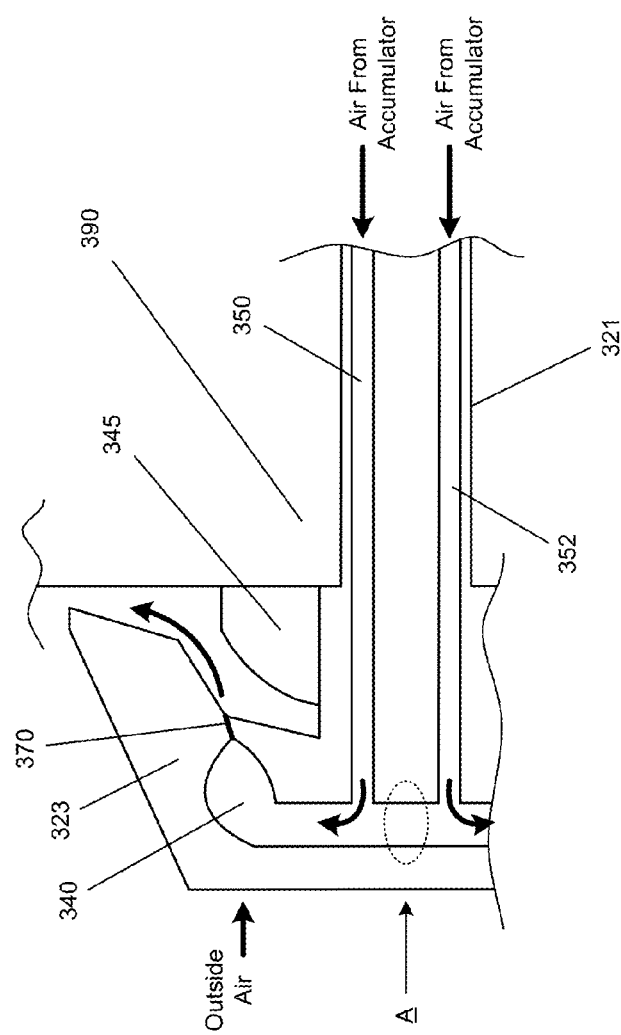
FIG. 3F is cross-sectional view of a sensor cleaning device for a vehicle, in one example.
Figure 3H:
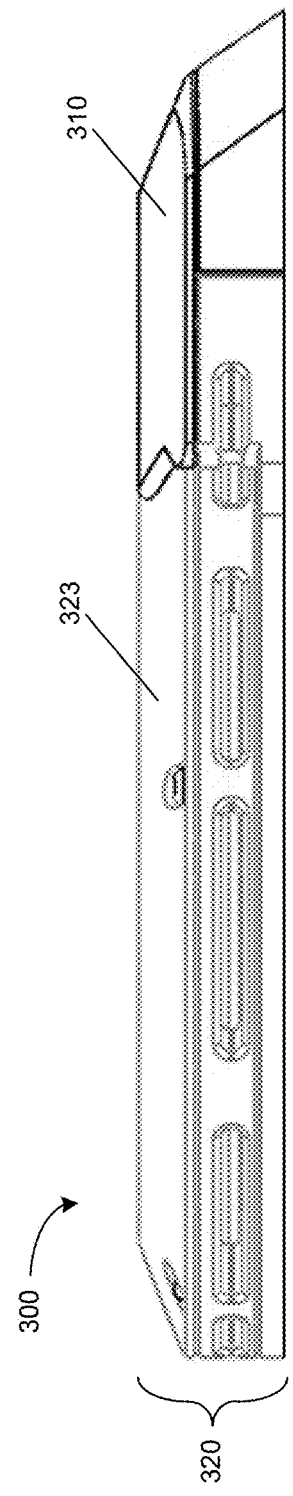
FIG. 3H is a side view of another example sensor cleaning device for a vehicle.

The flow of air through the lidar cleaning device 300 can be illustrated in an example of FIG. 3F. FIG. 3F is cross-sectional view of a portion of a lidar cleaning device 300. When the lidar cleaning device 300 is activated to clean a set of lidar sensors (e.g., lidar sensor 390 and/or lidar sensor 392), air can move from the accumulator of the sensor cleaning system 100, through a set of solenoid valves, through the support structure 310 and through a set of channels 350, 352 of the platform structure 321. For example, air can move through a respective channel of the second set of channels 350 and into a respective cavity 340. According to one example, the raised lip structure 323 can be constructed to enable outside air to enter the cavities 340

(e.g., via one or more openings 335). When the respective cavity 340 fills with air, the air can be ejected out of the respective slit opening 370 and in a direction towards the lidar sensor 390. The inner raised lip structure 345 can be shaped to enable the air to be moved in a direction upwards, such as shown in the illustration of FIG. 3F. Additionally, in some examples, air can move in a similar fashion to clean a second lidar sensor 392, via the third set of channels 352 of the platform structure 321. Still further, although the example of FIG. 3F illustrates an opening between the top portion of the platform assembly 320 and the bottom portion of the platform assembly (indicated by region A in a dotted ellipses), in other examples, no such opening is present.

In the examples described, the lidar cleaning device 300 can be used by the vehicle 10 to clean the lidar sensor(s) by forcing air onto the surface of the lidar sensor(s). According to some examples, the lidar sensor(s) can also be cleaned by using a set of nozzle devices that are positioned around the lidar cleaning device 300 (and the lidar sensor(s)). For example, referring to FIG. 3G, three nozzle devices 380, 381, 382 (note that nozzle device 382 is behind the lidar sensors 390, 392 in this view) can each be positioned on a surface (e.g., the roof of the vehicle 10) and coupled, via a respective tube, to a respective pump of the set of pumps 160. The nozzle devices 380, 381, 382 can be structured to have a nozzle head or output that is angled upwards. Each nozzle device 380, 381, 382 can also include a check valve. When the individual nozzle devices 380, 381, 382 are activated (e.g., concurrently or one after the other), the force from the ejected fluid can hit different portions of the surface of the lidar sensors 390, 392. Still further, while each nozzle device 380, 381, 382 includes two fluid outputs in the example of FIG. 3G, in other examples, each nozzle device 380, 381, 382 can include more or less than two fluid outputs.

In the example of FIG. 3G, when the lidar sensors 390, 392 are to be cleaned, the vehicle computing system 50 can first cause the set of nozzle devices 380, 381, 382 to clean the lidar sensors 390, 392 with fluid (e.g., individually or concurrently), then subsequently cause the lidar cleaning device 300 to eject air to clean the surface of the lidar sensors 390, 392. The vehicle computing system 50 can control individual solenoid valves or a sub-set of solenoid valves corresponding to the lidar cleaning device 300 to be activated in order to cause the lidar cleaning device 300 to eject air out of respective individual slit openings (e.g., in a particular order) or eject air out of respective sub-sets of slit openings concurrently. In this manner, in such an example, the lidar cleaning device 300 can clean both the top lidar sensor 390 and the bottom lidar sensor 392 concurrently.

Figure 4B:
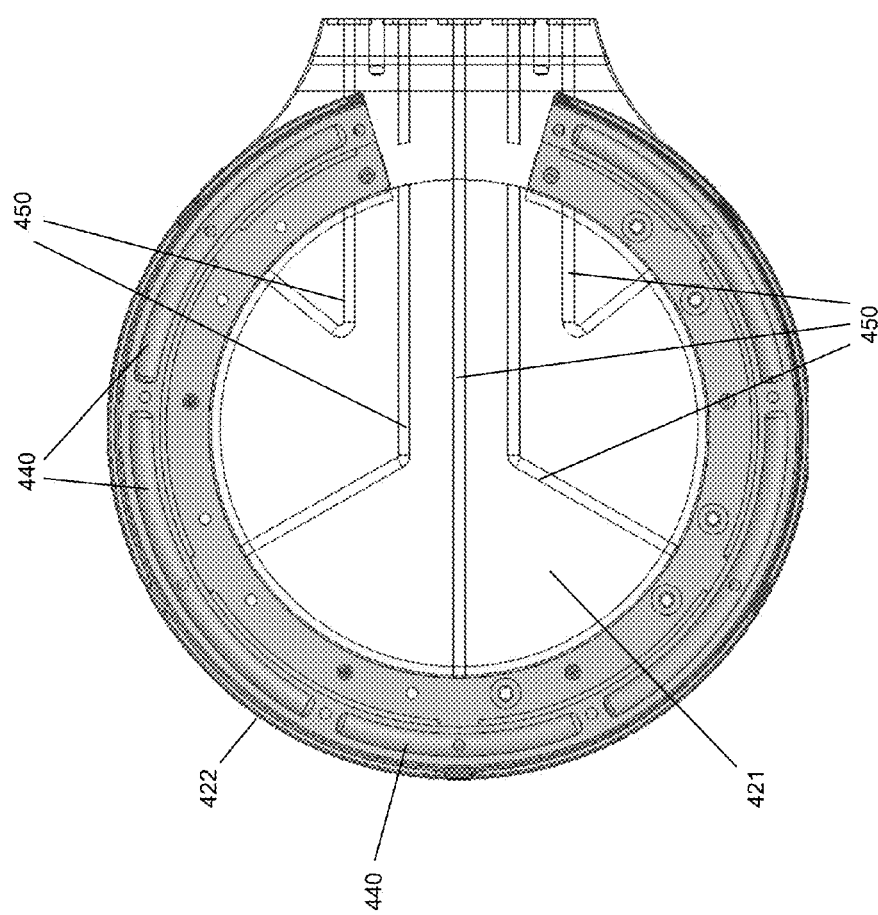

FIGS. 4A and 4B illustrate other example portions of a lidar cleaning device of the vehicle 10. Referring to FIG. 4A, the lidar cleaning device 400 can include a support structure that is coupled to a platform assembly 420. The platform assembly 420 can include a platform structure 421 that further includes a set of channels 450 that can move air into both the top portion of the platform assembly 420 and the lower portion of the platform assembly 420. The top portion can include a first raised lip structure 423 that is formed to include a set of cavities 440 and a set of corresponding slit openings 470. The lidar cleaning device 400 can also clean portions of both a top lidar sensor 490 and a bottom lidar sensor 492 concurrently.

FIG. 4B illustrates another variation of a portion of the platform assembly, according to a different example. For example, the platform structure 421 can include a set of channels 450 that are dispersed in a different manner than illustrated in FIG. 3C. Despite the different position of the set of channels 450, in FIG. 4B, the set of channels 450 still enable air to flow towards the perimeter 422 of the platform assembly and up through at least a portion of the raised lip structure 423 (note that for purposes of illustration, the full raised lip structure is not illustrated in FIG. 4B). Air can then flow from individual channels 450 (e.g., five channels in this example) to the respective cavities 440 (e.g., five corresponding cavities) when the lidar cleaning device 400 is active. Still further, although examples described herein illustrate a lidar cleaning device having a substantially circular or arc-shaped platform assembly, in other examples the platform assembly can have different shapes (e.g., rectangular, hexagonal, etc.).

For purposes of clarification, an operational example of the sensor cleaning system is described. In this example, the vehicle 10 is an AV having seven camera cleaning devices (CC1, CC2, ... CC7) that are coupled to seven cameras. Each camera cleaning device can clean a respective camera lens using fluid and using air, such as described herein. Each camera cleaning device can be connected to a pump and a solenoid valve via respective fluid and air tubes, respectively (e.g., CC1 is connected to P1 and SV1, CC2 is connected to P2 and SV2, and so on). The vehicle 10 can also have two lidar sensors that are coupled to a lidar cleaning device. The lidar cleaning device can have five slit openings for the top portion and five slit openings for the bottom portion. The lidar cleaning device (LC) can be connected to five solenoid valves (SV8, SV9, SV10, SV11, and SV12) via respective air tubes. In addition, three nozzle devices (ND1, ND2, and ND3) can be positioned around the two lidar sensors and can each be connected to a pump (P8, P9, and P10) via a respective fluid tube.

By controlling the pumps (P1 through P10), the vehicle computing system 50 can activate and cause the camera cleaning devices to clean the lens of the respective cameras with fluid individually or cause a set of camera cleaning devices (e.g., CC1, CC2, and CC3) to clean the lens of the respective cameras with fluid concurrently, and/or can activate and cause the nozzle devices to clean the lidar sensors with fluid individually or concurrently. Subsequently, the vehicle computing system 50 can activate the sensor cleaning devices to clean the respective sensors with air by controlling the solenoid valves (SV1 through SV12). Because the lidar cleaning device is connected to five solenoid valves via five respective tubes, different portions of the lidar sensors can be cleaned with air individually or concurrently in response to the vehicle computing system 50 controlling the solenoid valves S8 through S12. For example, the vehicle computing system 50 can activate the solenoid valves in order—e.g., activate SV8 for three seconds and then disable, activate SV9 for three seconds and then disable, and so on. In an alternate example, the vehicle computing system 50 can activate multiple solenoid valves at the same time, such as a subset or all solenoid valves connected to the lidar cleaning device—e.g., activate both SV8 and SV9 for a predefined duration of time and then disable, then activate SV10, SV11, and SV12 for a predefined duration of time and then disable.

Cleaning a sensor first with fluid then with air can enable debris, smudges, dirt, etc., to be more efficiently removed from the surface of the sensor (as opposed to using just fluid or just air). In addition, in some examples, by cleaning sensors or sub-sets of sensors individually or in sequence (or cleaning portions of the lidar sensors individually or in sequence), fluid and/or air can be outputted with more force to impact and better clean the surface of the sensors.

Accordingly, depending on variations, the vehicle computing system 50 can provide individual sets of controls (e.g., a set of air control signals 141, a set of fluid control signals 161) to the components of the sensor cleaning system 100 based on different triggering events and/or schedules. For example, the vehicle computing system 50 can provide the set of air controls signals 141 and/or the set of fluid control signals 161 to the individual pumps and solenoid valves (i) based on a predetermined schedule (e.g., a sequence of sensors to be cleaned) (ii) based on the operation of the vehicle 10 (e.g., only clean when the vehicle 10 is stopped and/or in a state in which a transport service is not being provided to a human rider, etc.) and/or (iii) when the vehicle computing system 50 detects that a sensor is occluded because of debris or dirt on the surface (e.g., this can be intermittent and outside the predetermined schedule).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is being claimed is:

1. A sensor cleaning device, comprising:
   a first valve to move fluid from a first end to a second end of the first valve;
   a second valve to control airflow from an air compressor;
   a set of fluid nozzles to eject the fluid onto a lens of a sensor; and
   a housing structure coupled to the first valve, the second valve, and the set of fluid nozzles, the housing structure comprising: (i) a first channel to channel the fluid from the second end of the first valve to the set of fluid nozzles, (ii) a cavity, (iii) a second channel to channel air from the second valve to the cavity, and (iv) a slit opening to eject air from the cavity to the lens of the sensor.

2. The sensor cleaning device of claim 1, wherein the housing structure further includes a set of coupling mechanisms to couple the housing structure to a ring structure of the sensor, the ring structure encircling the lens of the sensor.

3. The sensor cleaning device of claim 1, wherein the housing structure includes a central opening, and the central opening encircling the lens of the sensor.

4. The sensor cleaning device of claim 3, wherein the set of fluid nozzles and the slit opening separately eject the fluid and the air, respectively, onto the lens of the sensor at an angle from a proximate region of the lens to a distant region of the lens, and wherein the proximate region is physically closer to the set of fluid nozzles than the distant region.

5. The sensor cleaning device of claim 4, wherein the set of fluid nozzles includes a first fluid nozzle to eject the fluid at a first angle towards the lens and a second fluid nozzle to eject the fluid at a second angle towards the lens.

6. The sensor cleaning device of claim 5, wherein the first fluid nozzle and the second fluid nozzle eject the fluid concurrently.

7. The sensor cleaning device of claim 1, wherein the set of fluid nozzles is pivotably coupled to the housing structure.

8. The sensor cleaning device of claim 1, wherein each of the first and second valves correspond to check valves.

9. A sensor cleaning system, comprising:
   a fluid reservoir to store fluid;
   a set of pumps coupled to the fluid reservoir;
   an air compressor to compress air;
   an air accumulator coupled to the air compressor to store compressed air;
   a set of solenoid valves to control output of compressed air; and
   a set of sensor cleaning devices, each sensor cleaning device including:
      a first valve to move fluid from a first end to a second end of the first valve, the first valve being connected to a respective pump of the set of pumps via a fluid tube;
      a second valve to control airflow from the air compressor, the second valve being connected to a respective solenoid valve of the set of solenoid valves via an air tube;
      a set of fluid nozzles to eject the fluid onto a lens of a sensor; and
      a housing structure coupled to the first valve, the second valve, and the set of fluid nozzles, the housing structure comprising: (i) a first channel to channel fluid from the second end of the first valve to the set of fluid nozzles, (ii) a cavity, (iii) a second channel to channel air from the second valve to the cavity, and (iv) a slit opening to eject air from the cavity to the lens of the sensor.

10. The sensor cleaning system of claim 9, further comprising:
    an air regulator coupled to the air accumulator, wherein the air regulator controls output of compressed air from the air accumulator to the set of solenoid valves.

11. The sensor cleaning system of claim 10, further comprising:
    a pressure sensor to measure air pressure of compressed air output from the air regulator.

12. The sensor cleaning system of claim 9, wherein the sensor cleaning system is included as a component of a vehicle.

13. The sensor cleaning system of claim 12, wherein a computing system of the vehicle transmits a first set of control signals to the set of pumps to selectively activate one or more pumps of the set of pumps at different times.

14. The sensor cleaning system of claim 13, wherein the computing system of the vehicle transmits a second set of control signals to the set of solenoid valves to selectively activate one or more solenoid valves of the set of solenoid valves at different times.

15. The sensor cleaning system of claim 14, wherein each of the first valve and the second valve of each sensor cleaning device comprise check valves.

16. The sensor cleaning system of claim 15, wherein when a pump of the set of pumps is selectively activated, the first valve of each sensor cleaning device enables fluid to flow from the first valve to clean the lens of the sensor coupled to each sensor cleaning device.

17. The sensor cleaning system of claim 16, wherein when a solenoid valve of the set of solenoid valves is selectively activated, the second valve of each sensor cleaning device causes air to flow from the second valve to clean the lens of the sensor coupled to each sensor cleaning device.

18. The sensor cleaning system of claim 14, wherein the computing system transmits the first set of control signals and the second set of control signals to the set of pumps and the set of solenoid valves, respectively, in order to cause the set of fluid nozzles and the slit opening of individual sensor cleaning devices to eject the fluid and the air, respectively, at different times.

19. The sensor cleaning system of claim 9, wherein the housing structure of each sensor cleaning device includes a central opening, and wherein the housing structure is mounted to a corresponding sensor so that the central opening encircles the lens of the corresponding sensor.

20. The sensor cleaning system of claim 19, wherein the set of fluid nozzles and the slit opening eject the fluid and the air, respectively, onto the lens of the sensor at an angle from a proximate region of the lens to a distant region of the lens, and wherein the proximate region is physically closer to the set of fluid nozzles than the distant region.

* * * * *